March 19, 1968  J. E. KILLPATRICK  3,373,650

LASER ANGULAR RATE SENSOR

Filed April 2, 1965  2 Sheets-Sheet 1

FIG. I

INVENTOR.
JOSEPH E. KILLPATRICK
BY Charles J. Ungemach
ATTORNEY

March 19, 1968  J. E. KILLPATRICK  3,373,650
LASER ANGULAR RATE SENSOR

Filed April 2, 1965  2 Sheets-Sheet 2

INVENTOR.
JOSEPH E. KILLPATRICK
BY Charles J. Ungemach
ATTORNEY

United States Patent Office 3,373,650
Patented Mar. 19, 1968

3,373,650
LASER ANGULAR RATE SENSOR
Joseph E. Killpatrick, Minneapolis, Minn., assignor to Honeywell Inc., Minneapolis, Minn., a corporation of Delaware
Filed Apr. 2, 1965, Ser. No. 445,171
8 Claims. (Cl. 88—14)

ABSTRACT OF THE DISCLOSURE

Bias system for laser gyroscope in which the gyroscope is electrically or mechanically oscillated so that it is effectively above the threshold rate a majority of the time including an optical system to compensate for this bias over short time intervals. Over longer time intervals the accumulated bias is relatively negligible.

---

The present invention relates to rotation measuring apparatus, and more particularly to apparatus and techniques for preventing frequency coupling in devices which compare the frequencies of two counter rotating beams of light as a measure of rotation. Although the present invention is described with reference to the use of laser produced light, it should be understood that the new and novel techniques disclosed are equally applicable to rotation measuring devices which utilize any electromagnetic radiation.

In a laser angular rate sensor, two monochromatic beams of light are generated in two opposite directions around a closed loop path about the axis of rotation. Rotation of the apparatus causes the effective path length for the two beams to change, thus, producing a frequency difference between the two beams since the frequency of oscillation of a laser is dependent upon the length of the lasing path.

The frequency difference between the two beams causes a phase shift between these beams which changes at a rate proportional to the frequency difference, thus, the phase shift between the two beams is proportional to the integral of the frequency difference. In other words, the output is representative of the integral of the input rate.

However, at low rotational rates when the difference in frequency between the two beams is small, the two beams tend to resonate together or "lock-in" so that the two beams oscillate at only one frequency. Thus, it becomes impossible to read low rotation rates because the frequency difference, which is proportional to the rotation rate, does not exist at these low rates.

The present invention avoids this problem by operating the laser angular rate sensor in a manner such that it is not required to measure low input rates directly. That is, the beams are electrically or mechanically oscillated with respect to the base so that the beams seem to be rotating at a rate higher than the lock-in rate for a majority of the time. The times when the beams are below the lock-in rate, at the extremities of the oscillation, are only very short intervals, and, consequently, do not substantially affect the operation of the sensor.

The maintenance of a frequency difference between the beams or biasing contemplated by my invention may be achieved mechanically or electrically. In the mechanical embodiment, the apparatus is simply oscillated about the axis so as to maintain an input rate higher than the lock-in rate for a majority of the time. In the electrical embodiment, a Faraday medium is used to bias the two laser beams by direct separation thereof. Accordingly, it is an object of the present invention to maintain a frequency difference in a laser angular rate sensor for a majority of the time so as to avoid lock-in of the two beams.

Further objects and advantages will become apparent in the following descriptions and drawings in which.

Figure 1:
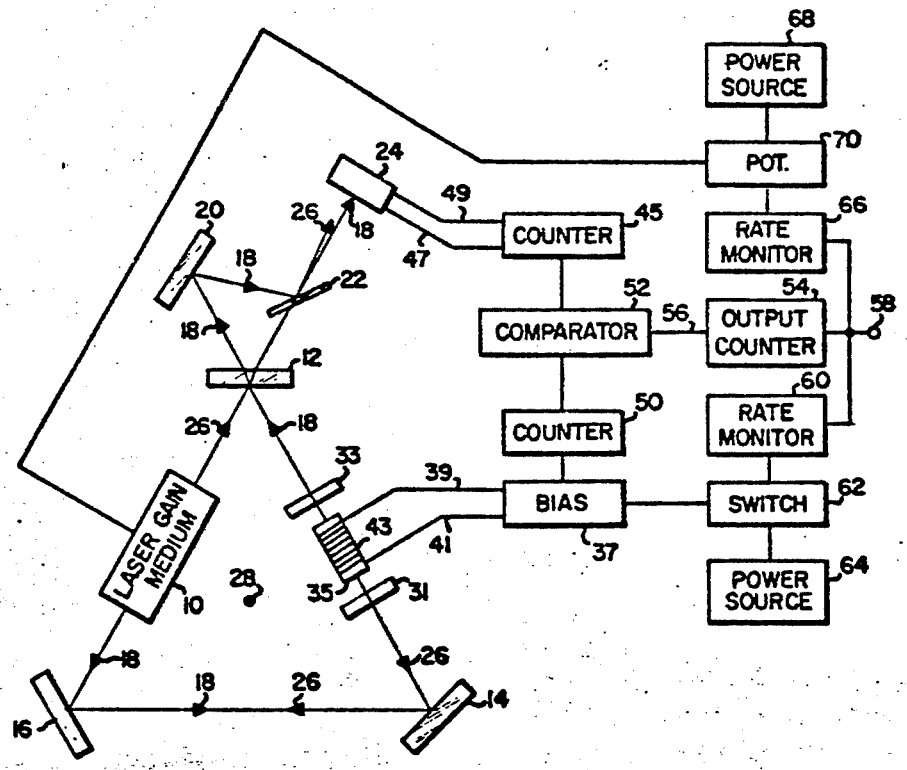
FIGURE 1 is a schematic diagram of the electrical embodiment of my invention.

In FIGURE 1 an electrical embodiment of my invention is schematically shown. A laser gain medium 10 is used to amplify and generate two oppositely traveling beams of substantially monochromatic light about a closed triangular path defined by mirrors 12, 14, and 16. The laser gain medium may be any suitable apparatus, well-known to those in the art, for amplifying monochromatic, coherent light in two directions. A small portion of the beam traveling in a direction indicated by a set of arrowheads designated by the reference numeral 18 passes through the mirror 12 which is slightly transparent and is reflected by a mirror 20 and a partially transparent mirror 22 to a detector array 24. The beam traveling in the direction indicated by arrowheads 26 partially passes through mirror 12 and partially transparent mirror 22 and impinges upon detector array 24 at a slightly different angle than beam 18. This slight angle between beam 18 and beam 26 causes a fringe pattern to be formed on detector array 24. This fringe pattern consists of a pattern of alternate light and dark bands of light which move to the left or right depending on the direction of rotation of the angular rate sensor. The rotation of this triangular loop is generally about the axis indicated by the reference numeral 28 and the rate of movement of the fringe pattern on detector array 24 is proportional to the rate of rotation of this triangular loop about axis 28. The position of the fringe pattern represents the integral of the frequency difference and, hence, the integrated input rate. Detector array 24 may be any suitable grouping of light sensitive detectors operable to count the rate of passage of the alternate dark and light bands of the fringe pattern and to determine their direction of movement. Such detector arrays are well known to those skilled in the art.

The two oppositely rotating beams of light, 18 and 26, are coursed to pass through a pair of quarterwave plates 31 and 33 and a Faraday medium 35. A source of bias current 37, by means of a pair of conductors 39 and 41 and a coil 43, maintains a magnetic field in the Faraday medium 35 so as to separate the frequencies of the two oppositely traveling beams in a manner well known to those skilled in the art. This produces an effective path length difference for the oppositely rotating beams and the resultant frequency difference avoids the problem of lock-in by keeping the frequencies of the two beams far enough apart. However, this frequency difference is recorded by detector array 24 as a false signal. This false signal or count is recorded on a counter 45 by means of a pair of conductors 47 and 49. The total accumulated count on counter 45 is indicative of the amount of rotation of the triangular loop plus the accumulated count which results from the frequency difference generated by Faraday medium 35 and bias source 37. In order to prevent the accumulater error on counter 45 from becoming important, the bias source 37 is of a variety which will periodically reverse polarity at an even rate so that the error signal resulting from Faraday medium 35 will periodically reverse and, thereby, cancel out over a long period of time. For the purposes of explanation, bias source 37 is described as producing a sine wave type of bias in this application, but it should be understood that any reversible bias which is operable to produce as many counterclockwise as clockwise counts would be suitable in this embodiment. During the reversing process the two beams will be at the same frequency for a very short time and will lock-in, but this brief period is so short that the effects are negligible.

Over a shorter period of time the output of counter 45 is not exactly representative of the rotation of the triangular loop because it has a sine wave modulation caused by bias source 37 superimposed on it. At any given instant the count on counter 45 is representative of the rotation of the loop plus the count from the Faraday medium 35. In order to eliminate this count from the Faraday medium at every instant a counter 50 is driven by the bias source 37 so as to produce counts of the same number as those caused on counter 45 by Faraday medium 35. These counts are then subtracted from the counts on counter 45 by means of a comparator 52 and the resultant signal, which is truly indicative of only the amount of rotation of the triangular loop about axis 28, is presented to an output counter 54 by means of a conductor 56. This output signal from output counter 54 is then presented to an output terminal 58 where it is available for the appropriate readout mechanisms.

The output signal from counter 54 is also presented to a rate monitor 60 which is operable to turn on a switch 62 and, thereby, activate bias source 37 by means of a power source 64 whenever the output counter 54 indicates that the rate of rotation of the system has fallen low enough so that the problem of lock-in will necessitate the use of a bias source such as source 37. Consequently, the use of a bias to separate the frequency of the two counter rotating beams is employed only when necessary, that is, when the rate of rotation of the system is so low that the frequencies of the two counter rotating beams are close together.

It should be noted that one of the possible advantages of using a current bias which is switched to plus and minus such as bias 37 is that, if desired, the signal of bias source 37 may be supplied through a transformer or a capacitor so that the integral of the frequency difference created is zero and, thus, the comparator 52 which adds and subtracts from the counter 45 would have no net counts. It follows that the accumulated count on output counter 54 would be only that which arises from rotation of the system.

The ratio of the amount of counts generated by detector array 24 relative to the amount of rotation of the system is called the "scale factor" and is known to be affected by changes in the gain of the laser gain medium 10. Also, due to a number of other factors well known to those skilled in the art, the scale factor changes in relation to the rotation rate of the system. One of these factors is how close to lock-in the system is operating. As the two beams approach each other in frequency, the linearity between the frequency difference and the amount of rotation, that is, the scale factor changes more and more. To offset this change and, therefore, minimize even more the amount of time the system spends at or near lock-in the scale factor may be controlled by the gain of the laser medium.

Since the output counter 54 gives information regarding the amount of rotation of the system, the rate of rotation may be determined therefrom and, thus, it may be determined therefrom how close to lock-in the system is operating. The preferred embodiment of FIGURE 1 shows a rate monitor 66 which operates to control the power supplied to the laser gain medium by a power source 68 through a potentiometer 70. This secondary control circuit operates to further stabilize the system by adjusting the amount of gain of laser gain medium 10 in accordance with the amount of rotation as measured by monitor 66 so as to keep the output of counter 45 linear with respect to the amount of rotation of the system and, therefore, maintain the scale factor constant.

Figure 2:
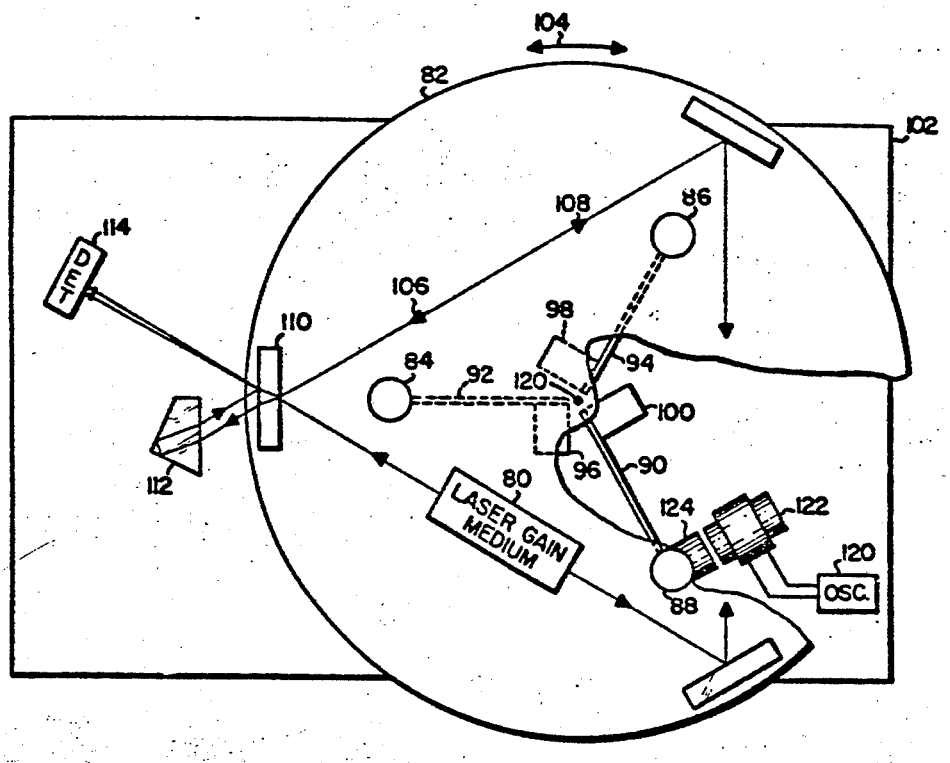
FIGURE 2 is a partially broken away drawing of a mechanical embodiment of my invention.

The biasing techniques of FIGURE 1 may also be accomplished mechanically. FIGURE 2 shows a second embodiment of the present invention which operates to bias the two laser beams mechanically so as to avoid the problem of lock-in. It should be understood that control circuits of the variety shown in FIGURE 1 may also be employed in apparatus of the nature of FIGURE 2, but that such circuits are not shown in FIGURE 2 for the purposes of clarity. In FIGURE 2 a laser gain medium 80 is shown supported on a rotatable base 82 which is mounted by means of three pegs 84, 86 and 88 to three leaf springs 90, 92 and 94 which are in turn mounted to three mounting blocks 96, 98 and 100. Blocks 96, 98 and 100 are securely fixed to a base 102 so that rotatable base 82 may vibrate back and forth as indicated by the arrow 104. Laser gain medium 80 amplifies and generates light about a closed triangular loop in the directions indicated by arrows 106 and 108 as already described with reference to FIGURE 1. At a partially transparent corner mirror 110 the two beams partially pass through and are combined by an internally reflecting right angle prism 112 and projected onto a detector array 114. Detector array 114 operates in the same manner as already described with reference to FIGURE 1. In FIGURE 2, right angle prism 112 is shown firmly attached to the nonmoving base 102 for reasons later explained. In order to oscillate the moving base 82 in a circular or rotational fashion, an oscillator 120 is shown driving an electromagnet 122 so as to periodically attract and repel a block 124 which is attached to the end of leaf spring 90. The resultant back and forth motion of leaf spring 90 causes table 82 to rotationally oscillate so that the two beams of laser light are rotating and, thus, are at different frequencies for a majority of the time. For two very short intervals during each oscillation, table 82 will be at a stand-still and the frequencies of the two counter rotating beams will be identical and the two beams will lock-in. However, this interval of time is so short as to be negligible in respect to the over-all operation.

If desired, an oscillator and electromagnetic drive unit may be utilized on each of the three leaf springs although only one is necessary. Another alternative is to drive electromagnet 122 by means of a pickoff which determines the rate of oscillation of the table 82 and drives the electromagnet in accordance with the amplified signals therefrom. In this way, the table 82 may be allowed to oscillate at its own natural resonant frequency, and, therefore, enjoy a more stable form of oscillation.

As already mentioned, it is desirable to eliminate the sine wave modulation of the output signal which results from the lock-in avoidance apparatus. By mounting prism 112 to the nonmoving base 102, the present invention neatly eliminates this sine wave modulation from the output signal. The reasons for this are better explained with reference to FIGURE 3 which shows a more detailed drawing of prism 112 and output mirror 110.

Figure 3:
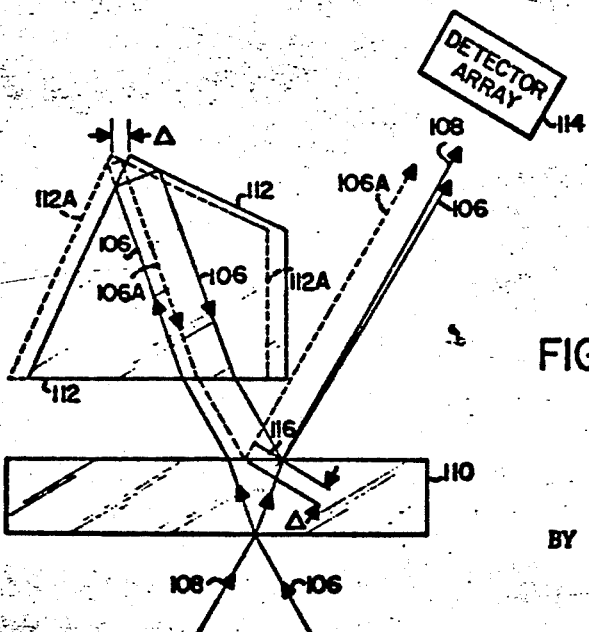
FIGURE 3 is a diagram in greater detail of the prism of FIGURE 2 showing the paths taken by the light beams emitted from the laser gain medium.

In FIGURE 3, in order to simplify the drawing, the prism 112 is shown as being displaced rather than the mirror 110 as is truly the case in FIGURE 2. As the table 82 in FIGURE 2 oscillates, it causes output mirror 110 to vibrate back and forth by a small amount, shown in FIGURE 3 as a displacement of prism 112 by an amount Δ. In the first position, laser beam 106 passes through output mirror 110 and into prism 112 where it is reflected internally by the right angle at the top of prism 112 and returns to mirror 110 where it is again reflected and combined with laser beam 108. As the relative position of prism 112 and mirror 110 changes by the amount Δ, so that prism 112 moves to the position shown as 112A the laser beam 106 now follows a new path shown as dashed line 106A. Because of the two internal reflections in prism 112 the light beam on path 106A is caused to return to mirror 110 at a point which is two times Δ to the left of where it originally struck mirror 110. In the preferred embodiment of FIGURE 2, this distance Δ is maintained small enough so that the displacement of the beam from the position of line 106 to dashed line 106A does not appreciably affect the fringe pattern seen by detector array 114. However, since the small triangle indicated by the number 116 is approximately a 30-60-90° triangle, this displacement to the left of two Δ causes an increase in the path length traveled by beam 106A of approximately Δ. Consequently, as table 82 oscillates it causes mirror 110 and prism 112 to move back and forth relative to each other by some small amount Δ which results in a path length change of Δ. It has been found in the preferred embodiment that this oscillating change in the effective path length provides an oscillating phase change in the light beam of path 106A which is of approximately the proper sign and magnitude to cancel out the sine wave modulation which is impressed upon the two laser beams from the rotation of the table 82. Thus, the fringe pattern seen by the detector array 114 may be made representative only of the rotation of the entire system and independent of the oscillation of the table 82.

Since a number of geometric factors enter into this cancellation, the amount of phase change caused by the relative shift of mirror 110 and prism 112 does not exactly cancel out the frequency difference caused by the oscillation of the table 82 if the table 82 is oscillated about its center shown in FIGURE 2 as axis 120. However, it has been found that oscillating table 82 about a slightly displaced axis will compensate for these geometric factors and, therefore, completely eliminate the sine wave modulation at the detector array 114.

It should be understood that other arrangements of optical components may be used to eliminate the sine wave modulation and a prism such as prism 112 should not be construed as the sole solution. For example, an optical wedge may be employed so that the movement of the beams with table 82 would cause the beams to travel through a varying thickness of the wedge in such a way as to cancel out the sine wave modulation. Any arrangement of optical components which will utilize the movement between table 82 and base 102 to change the optical path length of the beams in such a way as to cancel the sine wave modulation is suitable.

Various other modifications may be made to the apparatus herein disclosed. For instance, another method of eliminating the sine wave modulation impressed onto the two beams by the oscillation of table 82 would be to mount prism 112 directly on the table 82 so that the sine wave modulation would then be transmitted through to detector array 114. An angle encoder could then monitor the position of table 82 and use this information to drive a compensating counter similar to counter 50 in FIGURE 1 so that the resultant output signal could be electronically smothed out as described in FIGURE 1. Consequently, I do not intend the present invention to be limited to the particular embodiments and apparatus shown except as defined by the appended claims.

I claim:
1. In a device wherein two beams of monochromatic light are generated along a closed loop path in two opposite directions and the frequency difference between the two beams is determined as a measure of rotation thereof, apparatus to prevent lock-in of the two beams of light comprising:
    means biasing the beams of light at different frequencies; and
    means causing the bias to periodically reverse so that the integrated frequency difference therefrom is substantially zero.
2. Apparatus as set forth in claim 1 including means causing the biasing means to be operative only when necessary to prevent lock-in.
3. In a device wherein two counter rotating beams of substantially monochromatic light are compared in phase to sense the rotation thereof, apparatus to prevent lock-in of the two beams of light comprising:
    means supporting the two beams of light along a closed loop path in two opposite directions; and
    means oscillating said supporting means about an axis so as to keep the two beams at different frequencies for a majority of the time in order to maintain the integrated frequency difference therefrom substantially at zero.
4. Apparatus as set forth in claim 3 including optical means correcting the output of the device so as to negate the false signal which results from the induced oscillatory frequency difference.
5. Apparatus as set forth in claim 4 including means causing the oscillating means to be operative only when the difference in frequency between the two counter rotating beams of light falls below a predetermined value.
6. A laser angular rate sensor comprising in combination:
    means supporting two counter rotating beams of substantially monochromatic light along a closed loop path about an axis, a difference in frequency between said two beams being indicative of rotation of said supporting means about said axis;
    means recording the integrated frequency difference between said two beams;
    means vibrating said supporting means in a rotational mode to create a difference in frequency between the two beams for a majority of the time so as to minimize lock-in;
    means sensing the magnitude and direction of the oscillations of the supporting means caused by said vibrating means; and
    optical means producing a signal in accordance with said sensing means operable to correct the false signals presented to said recording means as a result of the vibration of said supporting means.
7. A laser angular rate sensor comprising in combination:
    a base;
    means supporting two counter rotating beams of substantially monochromatic light along a closed loop path about an axis, a difference in frequency between said two beams being indicative of rotation of said supporting means about said axis;
    means vibrating said supporting means in a rotational mode relative to said base to create a difference in frequency between the two beams for a majority of the time so as to minimize lock-in; and
    means diverting a portion of each of the two beams from said closed loop path to a detector to be phase compared, said diverting means including optical means operable to combine the portions of the two beams diverted, said optical means positioned so that the relative movement between the optical means and the closed loop path caused by the vibration of said supporting means provides a change in path length for the beams of proper direction and magnitude to cancel the false signal on said detector which results from the frequency difference generated by said vibrating means.
8. An angular rate sensor comprising in combination:
    a base;
    means supporting two counter rotating beams of substantially monochromatic light along a closed loop path about an axis, the difference in frequency between said two beams being indicative of rotation of said supporting means about said axis;
    radial leaf spring means mounting said supporting means to said base;
    means oscillating said supporting means in a rotational direction relative to said base so as to create a difference in frequency between two beams for a period of time which is large with respect to the period of time in which there is no frequency difference; and means diverting a portion of each of the two beams from said closed loop path to a detector to be phase compared, said diverting means including optical means mounted on said base operable to combine the portions of the two beams diverted, said optical means positioned so that the relative movement between the optical means and the closed loop path caused by the vibration of said supporting means provides a change of path length for one of the light beams, the change of path length being of the proper direction and magnitude to cancel the false signal on said detector which results from the frequency difference generated by said vibrating means.

References Cited

Davis et al.: Electromagnetic Angular Rotation Sensing, Interin Engineering Rep. #1, Sperry Report No. AB-1108-0016-1, Sperry Gyroscope Co., Great Neck, N.Y., September 1963, pp. 4-1 thru and including 4-7.

Macek et al.: Ring Laser Rate Sensor, Proced. of Symposium on Opt. Maser, Apr. 16, 1963, vol. XIII, TK7872L3593.

Laser Gyro's New Config., Electronics, June 28, 1963, vol. 36, #26, TK5800E58, p. 7.

JEWELL H. PEDERSEN, *Primary Examiner.*

B. J. LACOMIS, *Assistant Examiner.*

Disclaimer 3,373,650.—*Jospeh E. Killpatrick*, Minneapolis, Minn. LASER ANGULAR RATE SENSOR. Patent dated Mar. 19, 1968. Disclaimer filed Oct. 15, 1981, by the assignee, *Honeywell Inc.*

Hereby enters this disclaimer to claims 1 and 2 of said patent.

[*Official Gazette Jan. 5, 1982*]